(12) United States Patent
Fukushima et al.

(10) Patent No.: US 10,950,842 B2
(45) Date of Patent: Mar. 16, 2021

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 70 days.

(21) Appl. No.: 16/353,311

(22) Filed: Mar. 14, 2019

(65) Prior Publication Data
US 2019/0296312 A1 Sep. 26, 2019

(30) Foreign Application Priority Data
Mar. 26, 2018 (JP) .............................. JP2018-058174

(51) Int. Cl.
*H01M 2/20* (2006.01)
*H01M 2/34* (2006.01)
*H01B 7/00* (2006.01)
*H01M 2/10* (2006.01)

(52) U.S. Cl.
CPC .......... *H01M 2/206* (2013.01); *H01B 7/0045* (2013.01); *H01M 2/1077* (2013.01); *H01M 2/34* (2013.01); *H01M 2220/20* (2013.01)

(58) Field of Classification Search
CPC ........ H01M 2/202; H01M 2/20; H01M 2/206; H01M 2/1077; H01M 2/34
See application file for complete search history.

(56) References Cited

U.S. PATENT DOCUMENTS

2014/0065885 A1* 3/2014 Nakayama .......... H01M 10/482
439/627

FOREIGN PATENT DOCUMENTS

JP 2017-212128 11/2017

* cited by examiner

*Primary Examiner* — Olatunji A Godo
(74) *Attorney, Agent, or Firm* — Greenblum & Bernstein, P.L.C.

(57) ABSTRACT

Provided is a connection module that can prevent a detection wire from coming away from a branch line path that is formed as a narrow path with a simple configuration. A connection module includes: a busbar configured to connect electrode terminals of adjacent electricity storage elements to each other; an insulating protector configured to hold the busbar in an insulated manner; and a detection wire that is to be connected to the busbar. The insulating protector includes a main line path, and a branch line path that branches from the main line path, has a width narrower than the width of the main line path, and in which the detection wire 50 is to be routed. The branch line path includes a pair of opposing path walls, and an elastic retaining piece that is formed on at least one path wall of the pair of path walls.

6 Claims, 8 Drawing Sheets

CONNECTION MODULE

TECHNICAL FIELD

The technique disclosed herein relates to a connection module, and more specifically relates to the structure of a routing path of a detection wire that is connected to a busbar in a connection module disposed on an electricity storage element, and that detects the state of the electricity storage element.

BACKGROUND ART

Conventionally, the structure described, for example, in JP 2017-212128A is known as the structure of a routing path of a detection wire that detects the state of an electricity storage element in a connection module. JP 2017-212128A describes a configuration including a wire accommodating groove (hereinafter referred to as a "main line path") serving as a path of a plurality of bundled detection wires, and a wire accommodating groove (hereinafter referred to as a "branch line path") serving as a path of a single detection wire connected to a busbar. Also, a wire locking portion standing upright from the bottom portion of each of the main line path and the branch line path is provided on opposite sides of the corresponding detection wire(s), thus preventing the detection wires) from coming away from the path.

JP 2017-212128A is an example of related art.

SUMMARY OF THE INVENTION

However, when the branch line path becomes narrow with increasing compactness of the connection module, the branch line path will have a limited space on which the wire locking portion is provided. Accordingly, it becomes difficult to provide a wire locking portion standing upright from the bottom portion of the branch line path on opposite sides of the detection wire, as the one described in JP 2017-212128A. Therefore, there is a need for a connection module that can prevent the detection wire from coming away from the branch line path with a simple configuration even when the branch line path is formed as a narrow path.

The technique disclosed herein has been completed based on the above-described circumstances, and provides a connection module that can prevent the detection wire from coming away from the branch line path with a simple configuration even when the branch line path is formed as a narrow path.

A connection module disclosed herein is directed to a connection module that can be attached to an electricity storage element group in which a plurality of electricity storage elements including positive and negative electrode terminals are arranged, the connection module including: a busbar configured to connect the electrode terminals of the adjacent electricity storage elements to each other; an insulating protector configured to hold the busbar in an insulated manner; and a detection wire that is to be connected to the busbar, and is configured to detect a state of the electricity storage elements. The insulating protector includes: a main line path in which the detection wire is to be routed in a bundled form; and a branch line path that branches from the main line path, has a width narrower than a width of the main line path, and in which the detection wire is to be routed. The branch line path includes a pair of opposing path walls; and an elastic retaining piece that is formed on at least one of the pair of path walls, and that elastically deforms in a width direction of the branch line path, and the elastic retaining piece has a shape in which a gap between the elastic retaining piece and the path wall opposed thereto is smaller than a diameter of the detection wire.

With the present configuration, the elastic retaining piece that elastically deforms in the width direction of the branch line path is formed on at least one of the pair of path walls of the branch line path. Also, the elastic retaining piece has a shape in which the gap between the elastic retaining piece and the path wall opposed thereto is smaller than the diameter of the detection wire. Accordingly, even when the branch line path has a small width, and the gap between the elastic retaining piece and the path wall opposed thereto is smaller than the diameter of the detection wire, the detection wire can be routed in the branch line path by elastically deforming the elastic retaining piece in the width direction of the branch line path when routing the detection wire in the branch line path. After the detection wire has been routed, the elastic retaining piece returns to its original position, and the gap between the elastic retaining piece and the second path wall opposed thereto becomes smaller than the diameter of the detection wire. Accordingly, it is possible to prevent the detection wire from coming away from the branch line path. That is, with the present configuration, even when the branch line path is formed as a narrow path, it is possible to prevent the detection wire from coining away from the branch line path with a simple configuration.

In the above-described connection module, the branch line path may include a busbar connection portion at which the detection wire is to be connected to the busbar, and the path wall on which the elastic retaining piece is formed may have a slit that is provided adjacent to the elastic retaining piece, and that extends downward from a top portion of the path wall, a distal end portion of the slit being located at a position at a predetermined distance from a bottom surface of the busbar connection portion.

With the present configuration, the slit is provided adjacent to the elastic retaining piece, and therefore the elastic retaining piece can easily elastically deform in the width direction of the branch line path. Furthermore, since the distal end portion of the slit is located at a position at a predetermined distance from the bottom surface of the busbar connection portion, the creepage distance along the path wall can be increased, thus preventing a short circuit from occurring between the adjacent busbars via the path wall.

In the above-described connection module, the elastic retaining piece may be formed on a top portion of at least one of the pair of path walls.

With the present configuration, the elastic retaining piece is formed on the top portion of at least one of the pair of path walls. Accordingly, the elastic retaining piece can more easily elastically deform in the width direction of the branch line path, thus facilitating the routing operation of the detection wire.

In the above-described connection module, the branch line path may include a branch portion extending in connection with the main line path, and the branch portion may have a branch portion bottom surface that is located at a position higher than the bottom surface of the busbar connection portion and a bottom surface of the main line path.

With the present configuration, the branch portion has the branch portion bottom surface that is located at a position higher than the bottom surface of the main line path. Accordingly, it is not necessary to insert the detection wire to a low position of the branch line path having a small width when routing the detection wire from the main line path to the branch line path, and it is thus possible to enhance the routing operability.

In the above-described connection module, the elastic retaining piece and the slit may be formed on/in the path wall that is located at the branch portion.

With the present configuration, the elastic retaining piece and the slit are formed on/in the path wall located at the branch portion. Accordingly, the detection wire can be more easily inserted when inserting the detection wire from the main line path into the branch line path, thus further enhancing the routing operability.

In the above-described connection module, the branch line path may include a link portion that is located between the busbar connection portion and the branch portion, and configured to link the busbar connection portion and the branch portion with each other, the link portion including a tapered bottom surface that is inclined toward the branch portion bottom surface from the bottom surface of the busbar connection portion.

With the present configuration, the link portion that links the busbar connection portion and the branch portion with each other has the tapered bottom surface. Since the tapered bottom surface prevents formation of a step between the branch portion bottom surface and the bottom surface of the busbar connection portion, it is possible to reduce the stress exerted on the routed detection wire due to a step formed through routing.

With the connection module disclosed herein, it is possible to prevent the detection wire from coming away from the branch line path with a simple configuration even when the branch line path is formed as a narrow path.

EMBODIMENTS OF THE INVENTION

Embodiment

Figure 1:
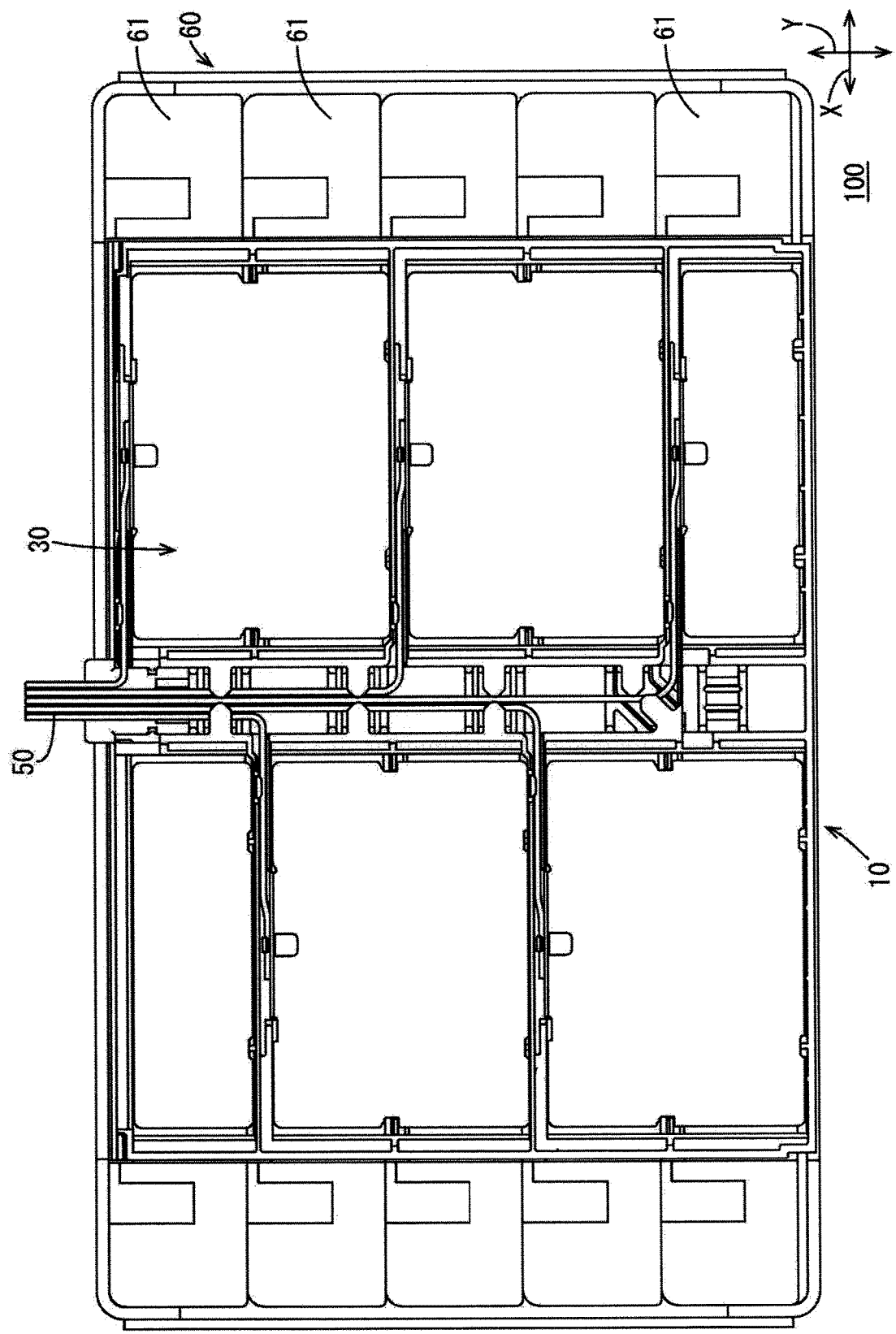
FIG. 1 is a plan view of an electricity storage module including a connection module according to an embodiment.
Figure 2:
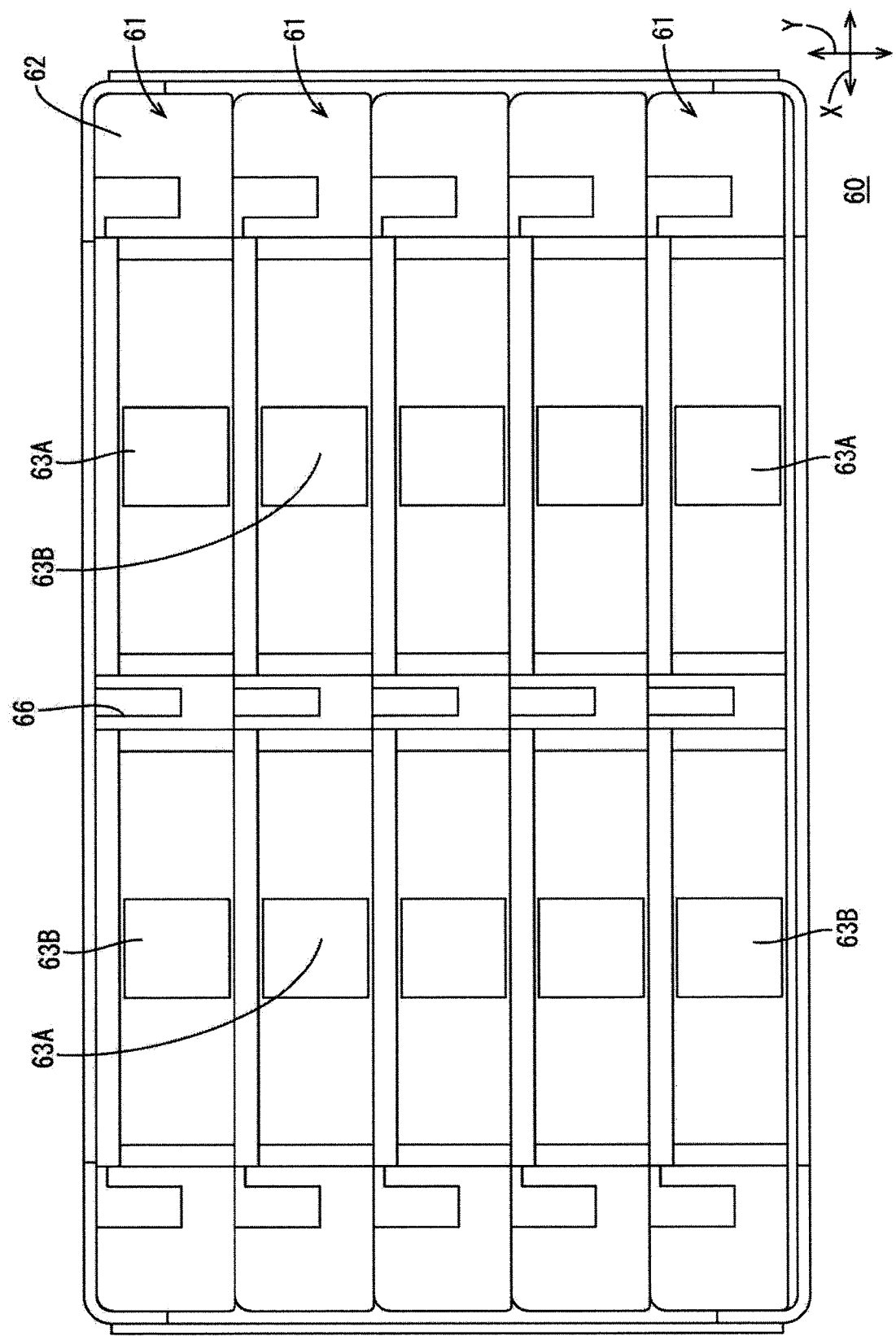
FIG. 2 is a plan view of an electricity storage element group.
Figure 3:
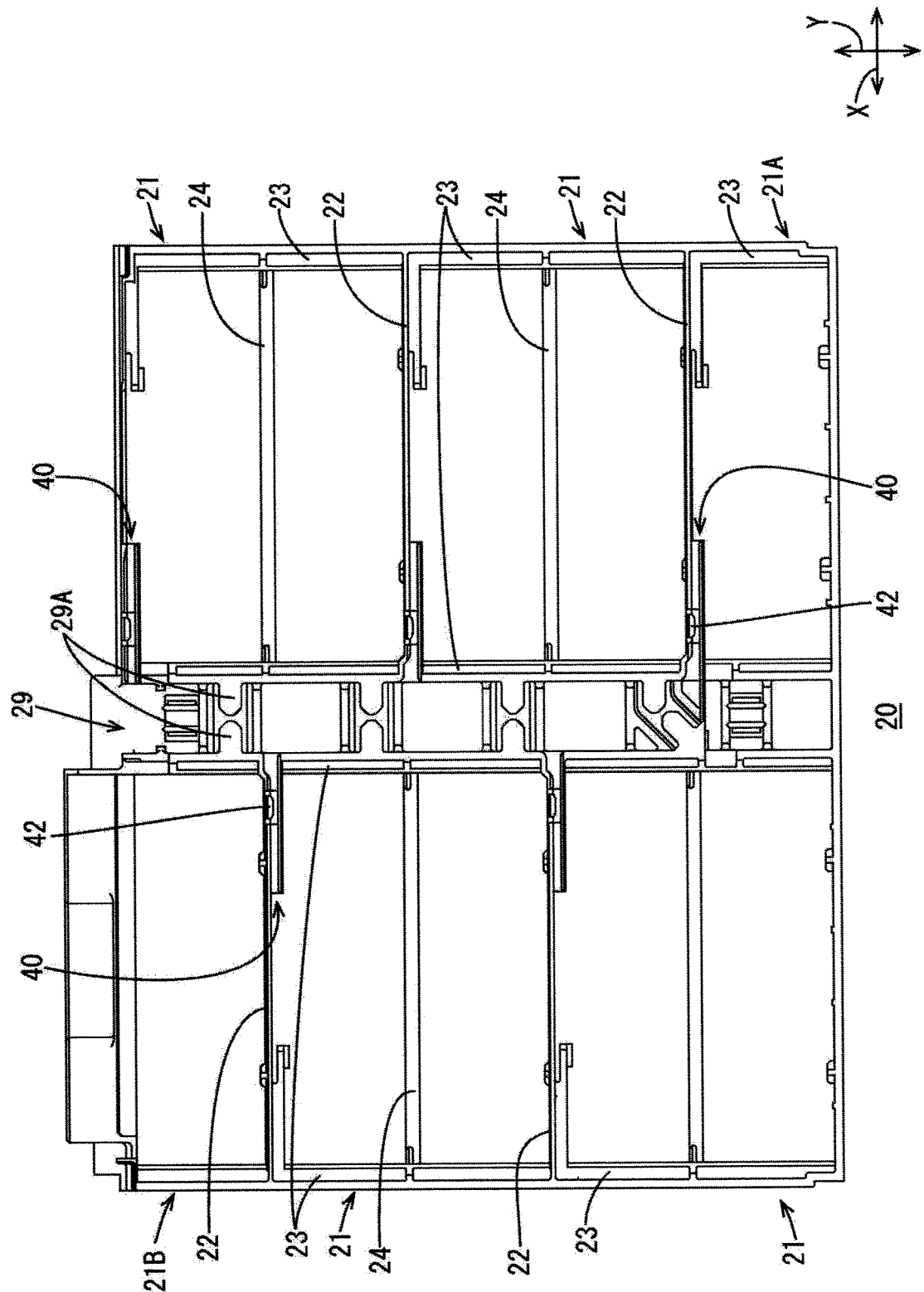
FIG. 3 is a plan view of an insulating protector of the connection module.
Figure 4:
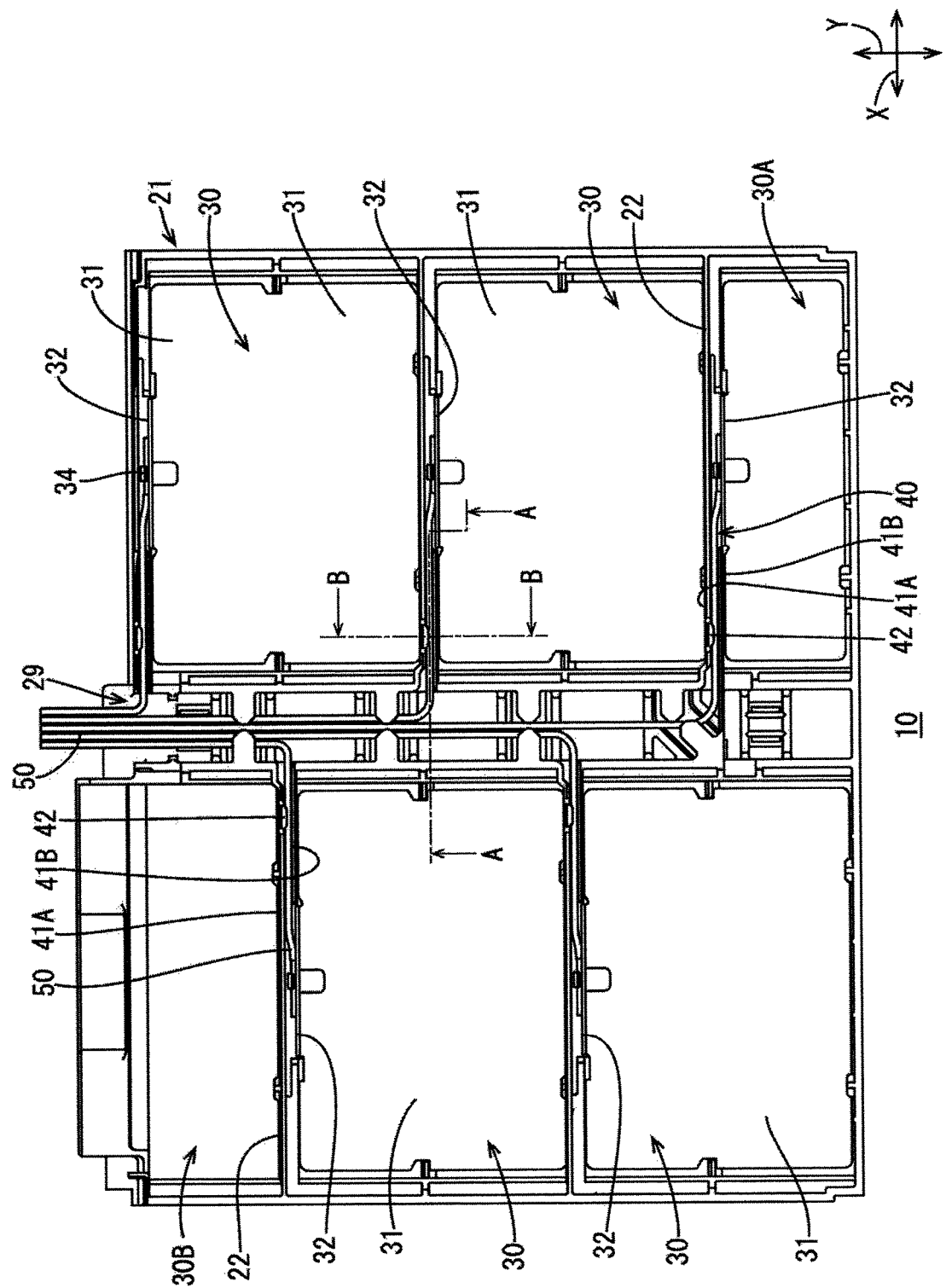
FIG. 4 is a plan view of the connection module.
Figure 7:
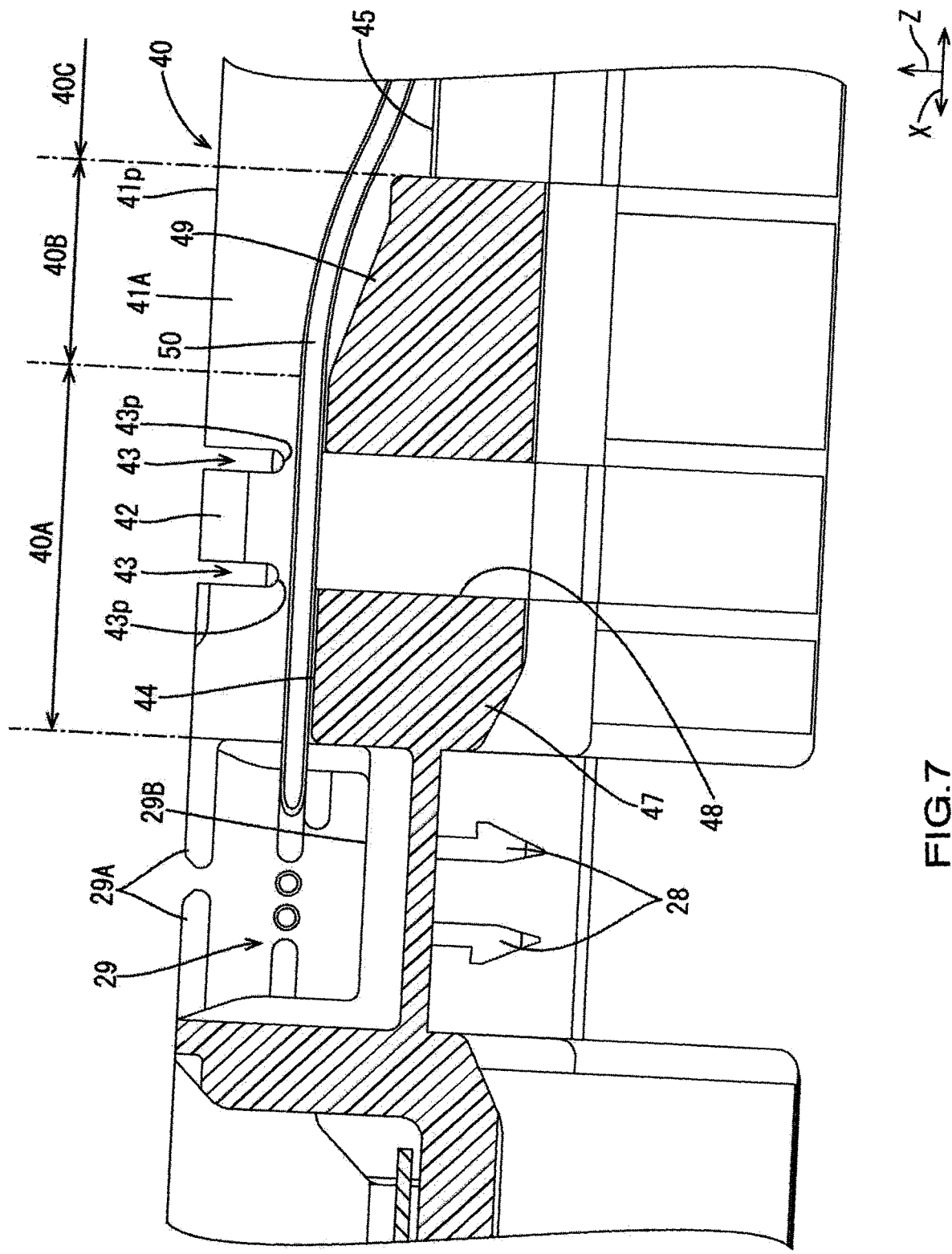
FIG. 7 is a cross-sectional view of the branch line path taken along the line A-A in FIG. 4.
Figure 8:
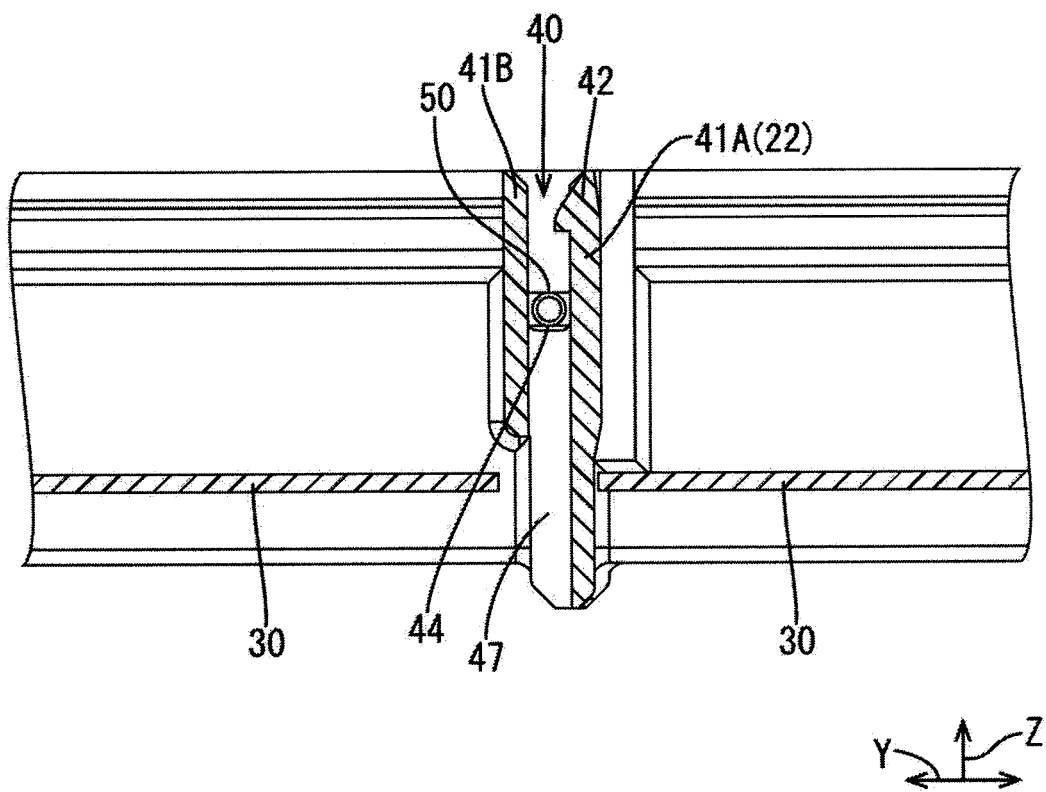
FIG. 8 is a cross-sectional view of the branch line path taken along the line B-B in FIG. 4.

An embodiment will be described with reference to FIGS. 1 to 8. Note that FIG. 7 is a cross-sectional view taken along the line A-A in FIG. 4, and FIG. 8 is a cross-sectional view taken along the line B-B FIG. 4. The following description is given assuming that the direction indicated by the arrow X in FIG. 1 is the longitudinal direction of electricity storage elements 61, and the direction indicated by the arrow Y in FIG. 1 is the arrangement direction of the electricity storage elements 61. The description is given also assuming that the direction indicated by the arrow Z in FIG. 7 is upward (height direction). For a plurality of identical members, a reference numeral may be assigned to one member, and reference numerals omitted for the other members.

An electricity storage module 100 to which a connection module 10 according to the present embodiment can be attached is used as a power source that is mounted on a vehicle (not shown) such as an electric car or a hybrid car in order to drive the vehicle.

1. Configuration of Electricity Storage Module

As shown in FIG. 1, the electricity storage module 100 is mainly composed of an electricity storage element group 60 formed by arranging a plurality of electricity storage elements 61, and a connection module 10 attached on the electricity storage element group 60.

1-1. Electricity Storage Element Group and Electricity Storage Element

The electricity storage element 61 of the present embodiment may be a secondary battery, for example. As shown in FIG. 2, a plurality of (five in the present embodiment) electricity storage elements 61 are arranged in a row, thus forming an electricity storage element group 60.

As shown in FIG. 2, a pair of planar electrode terminals (63A, 63B) are disposed on each of the electricity storage elements 61. One of the electrode terminals 63 is a positive electrode terminal 63A, and the other is a negative electrode terminal 63. Note that one of the electrodes of each of the electricity storage elements 61 at opposite ends in the arrangement direction of the electricity storage elements (the arrow Y direction in FIG. 1) of the electricity storage element group 60 is used as an external connection electrode.

A recess 66 to which a protrusion 28 of an insulating protector 20, which will be described below, is fitted is provided at a central portion between the pair of electrode terminals (63A, 63B) on an electrode placement surface 62 of each of the electricity storage elements 61. As a result of the protrusion 28 of the insulating protector 20 being fitted to the recess 66, the connection module 10 is fixed onto the electricity storage element group 60.

As shown in FIG. 2, the plurality of electricity storage elements 61 are arranged such that electrode terminals 63 of different polarities are adjacent to each other the positive electrode terminal 63A of one electricity storage element 61 and the negative electrode terminal 63B of the electricity storage element 61 adjacent thereto are adjacent to each other) on two adjacent electricity storage elements 61.

1-2. Connection Module

The connection module 10 can be attached to the upper portion of the electricity storage element group 60. The connection module 10 includes an insulating protector 20, busbars 30, detection wires 50, and so forth.

Each detection wire 50 is connected to the corresponding busbar 30, and detects the state of the corresponding electricity storage elements 61. In the present embodiment, the detection wire 50 is a voltage detection line for detecting the voltage of the electricity storage elements 61. The detection wire 50 is a coated wire, and is composed of a core wire 51 and an insulating covering 52 that covers the core wire 51 (see FIG. 5). Note that the detection wire 50 is not limited to a voltage detection line.

The insulating protector 20 is formed by an insulating member made of a synthetic resin or the like. As shown in FIG. 3, the insulating protector 20 includes a plurality of busbar holding portions 21, a main line path 29, and branch line paths 40.

Each of the busbar holding portions 21 has a rectangular shape in plan view, opens in a vertical direction, and accommodates and holds the corresponding busbar 30. As shown in FIG. 3, the busbar holding portions 21 are provided on opposite sides on the main line path 29 across the main line path 29. Each busbar holding portion 21 includes an insulating wall 22, a pair of short-side walls 23, and a strut portion 24.

The insulating wall 22 is located at one of long-side portions of the busbar holding portion 21, and separates adjacent busbars 30 in an insulated manner. The insulating wall 22 forms a first path wall 41A of a branch line path 40, which will be described below. The pair of short-side walls 23 are located at the two short-side portions of the busbar holding portion 21, and hold the busbar 30. The strut portion 24 couples the pair of short-side walls 23, and supports the busbar 30.

As shown in FIG. 3, the main line path 29 is located at a central portion of the insulating protector 20 in plan view, and the detection wires 50 are routed in a bundled form in the main brie path 29. Lift stopper pieces 29A that prevent the detection wires 50 from lifting are formed on the main line path 29.

Each branch line path 40 branches from the main line path 29, and has a width narrower than the width of the main line path 29, and a detection wire 50 is routed in the branch line path 40.

Figure 5:
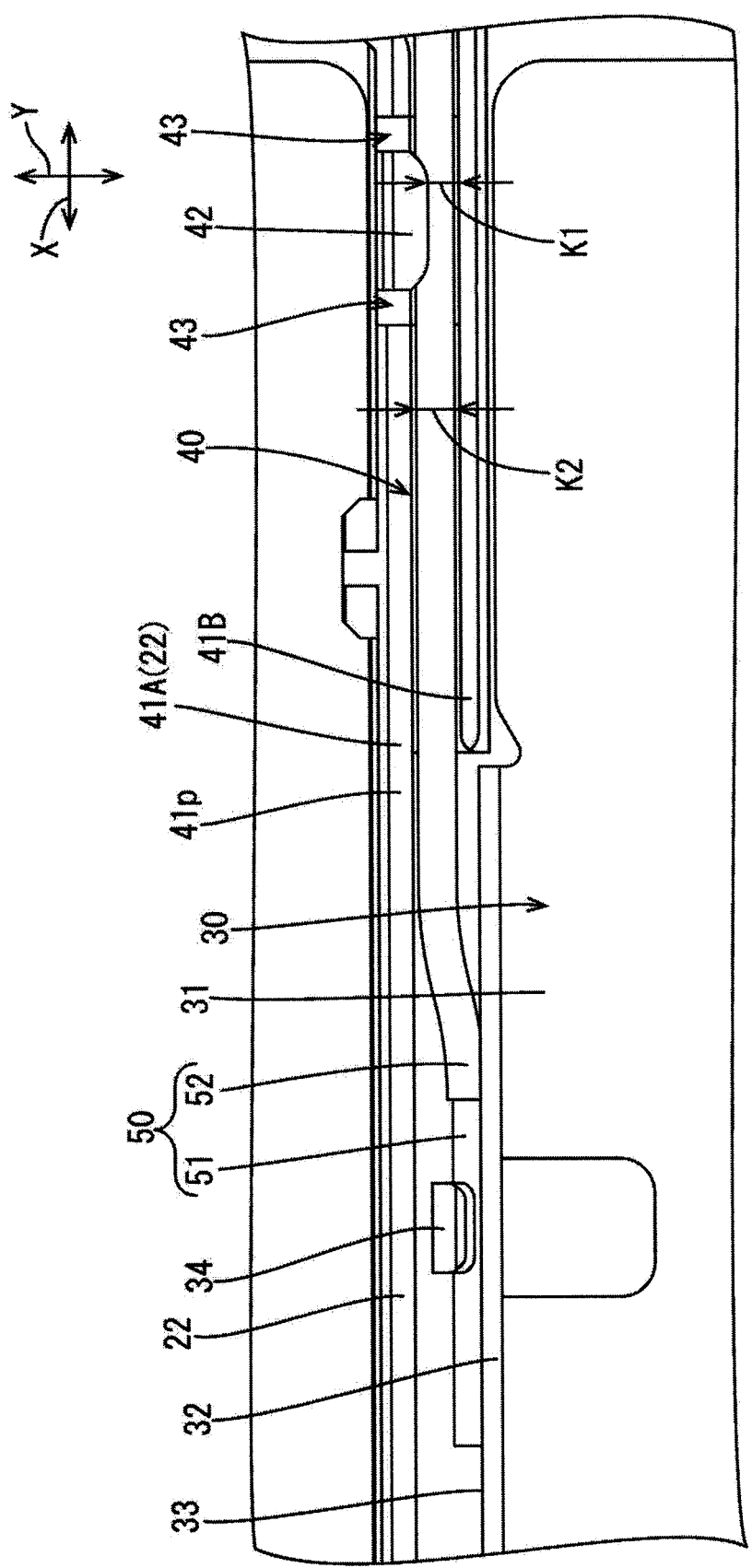
FIG. 5 is a partial enlarged view of a branch line path in FIG. 4.

As shown in FIG. 5 and, so forth, the branch line path 40 includes a pair of path walls, namely, a first path wall 41A and a second path wall 41B, an elastic retaining piece 42 that is formed on a top portion 41p of the first path wall 41A, and elastically deforms in the width direction (the arrow Y-direction in FIG. 5) of the branch line path 40, and a bottom portion 47.

Note that, in the present embodiment, the first path wall 41A is formed by a portion of the insulating wall 22. The first path wall 41A and the second path wall 41B correspond to the pair of opposing path walls, and the first path wall 41A corresponds to at least a portion of the pair of path walls. In consideration of routing of the detection wires 50, for example, the heights of the pair of path walls (41A, 41B) need not be the same. For example, the height of the second path wall 41B may be smaller than the height of the first path wall 41A.

The elastic retaining piece 42 has a shape in which, in plan view, a gap K1 between the elastic retaining piece 42 and the second path wall 41B opposed thereto is smaller than a diameter K2 of the detection wire 50 (see FIGS. 5 and 8). A mold removal hole 48 for molding of the elastic retaining piece 42 is formed in the bottom portion 47 (see FIG. 7).

Here, the gap K1 between the elastic retaining piece 42 and the second path wall 41B opposed thereto specifically refers to the shortest gap (the shortest distance) between the elastic retaining piece 42 and the second path wall 41B opposed thereto, irrespective of the viewing direction. The present embodiment is an example in which the gap K1 is the shortest gap in plan view, and the present disclosure is not limited thereto. The gap K1 may be the shortest gap in a view other than plan view.

Figure 6:
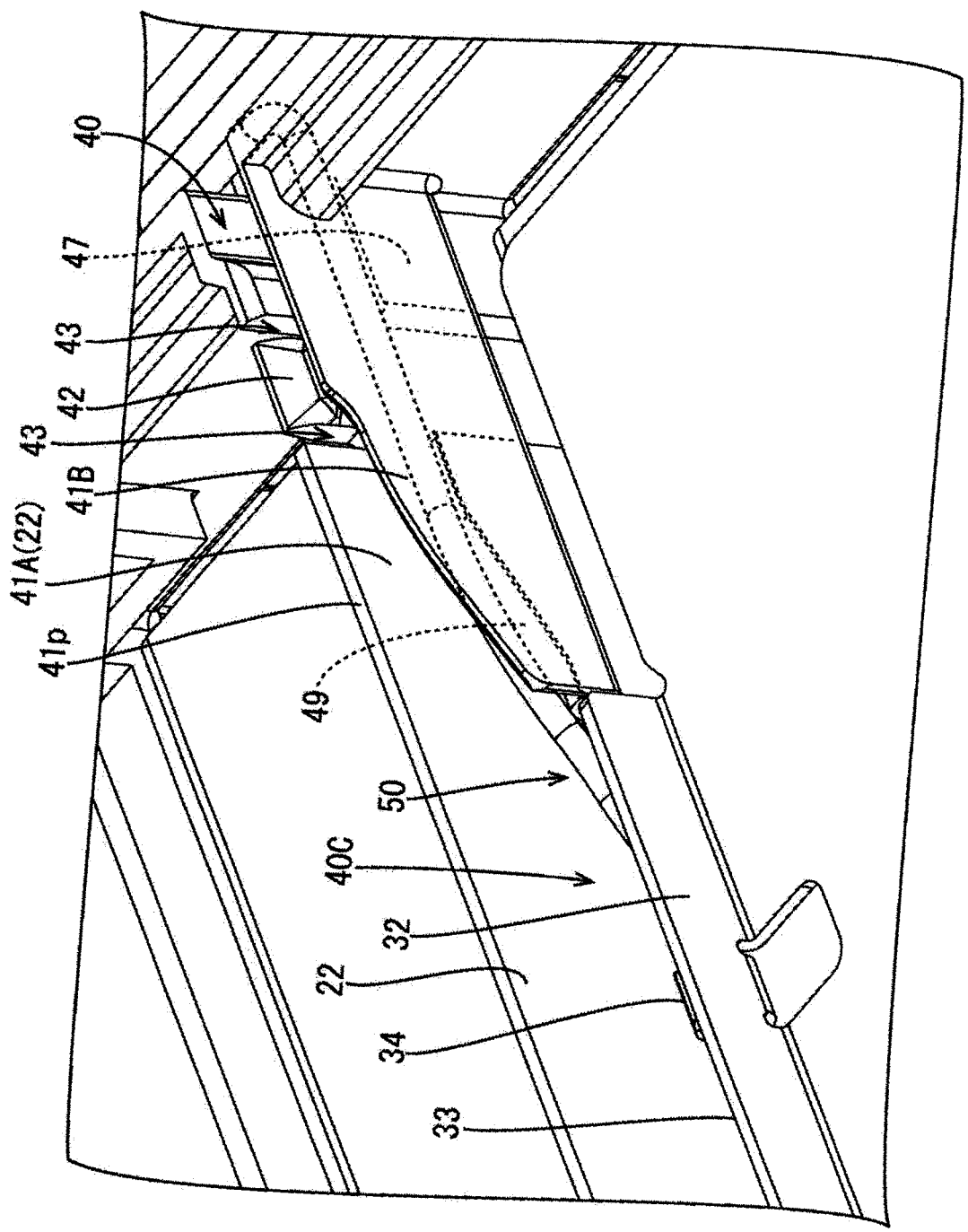
FIG. 6 is a partial perspective view of the branch line path of the connection module.

As shown in FIGS. 5, 6 and so forth, slits 43 are formed in the first path wall 41A, on which the elastic retaining piece 42 is formed. The slits 43 are provided adjacent to the elastic retaining piece 42 on opposite sides thereof, and extend downward from the top portion 41p of the first path wall 41A. Since the slits 43 are provided adjacent to the elastic retaining piece 42 on opposite sides of the elastic retaining piece 42 in this manner, the elastic retaining piece 42 can easily elastically deform in the width direction (the arrow Y direction in FIG. 5) of the branch line path.

Then, the elastic retaining piece 42 is formed on the top portion (the top portion of at least one of the pair of path walls) 41p of the first path wall 41A. Accordingly, the elastic retaining piece 42 can more easily elastically deform in the width direction of the branch line path, thus facilitating the routing operation of the detection wire.

As shown in FIG. 7, a distal end portion 43P of each slit 43 is located at a position at a predetermined distance away from a bottom surface 45 of a busbar connection portion 40C, which will be described below, in the height direction thereof (the arrow Z direction in FIG. 7). Accordingly, even when the slits 43 are provided in the first path wall 41A, the creepage distance along the first path wall 41A can be increased. Consequently, it is possible to inhibit a short circuit due to condensation or the like from occurring between adjacent busbars via the first path wall 41A.

As shown in FIG. 7, the branch line path 40 includes three portions, namely, a branch portion 40A, a link portion 40B, and a busbar connection portion 40C.

The branch portion 40A is a portion extending in connection with the main line path 29, and has a branch portion bottom surface 44 located at a position higher than a bottom surface 45 of the busbar connection portion 40C and a bottom surface 29B of the main line path 29. The bottom surface 45 is a surface of the bottom portion 47 of the branch portion 40A, and the branch portion bottom surface 44 is a surface of the bottom portion 47 of the busbar connection portion 40C.

Due to such a positional relationship between the bottom surfaces, in particular, the relationship in which the branch portion bottom surface 44 is located at a position higher than the bottom surface 29B of the main line path 29, it is not necessary to insert the detection wire 50 to a low position of the branch line path 40 having a narrow width when routing the detection wire 50 from the main line path 29 to the branch line path 40, and it is thus possible to enhance the routing operability.

The elastic retaining piece 42 and the slits 43 are formed in/on the first path wall 41A located at the branch portion 40A. Accordingly, the branch portion 40A is adjacent to the main line path 29, and thus the detection wire 50 can be more easily inserted when inserting the detection wire 50 from the main line path 29 into the branch line path 40, as compared with a case where the elastic retaining piece 42 and the slits 43 are formed on/in the link portion 40A and the busbar connection portion 40C. Therefore, it is possible to further enhance the routing operability. In addition, it is possible to further increase the effect of preventing coming away of the detection wire 50 by the elastic retaining piece 42.

The link portion 40B is located between the branch portion 40A and the busbar connection portion 40C, and links the branch portion 40A and the busbar connection portion 40C with each other. The link portion 40B has a tapered bottom surface 49 that is inclined toward the branch portion bottom surface 44 from the bottom surface 45 of the busbar connection portion 40O. The tapered bottom surface 49 is a surface of the bottom portion 47 of the link portion 40B. With this configuration, the tapered bottom surface 49 prevents formation of a step between the branch portion bottom surface 44 and the bottom surface 45 of the busbar connection portion 40O, thus making it possible to reduce the stress exerted on the routed detection wire 50 due to a step formed through routing.

The busbar connection portion 40O is a portion at which the detection wire 50 is connected to the busbar 30, and a wire connection portion 32 of the busbar 30 is located at the busbar connection portion 400 (see FIG. 6).

Note that busbar holding portions (21A, 21B) having a structure different from that of the busbar holding portion 21 are provided at the positions corresponding to the external connection electrodes. The busbar holding portion 21A holds an external connection busbar 30A, which will be described below, and the busbar holding portion 21B holds an external connection busbar 30B, which will be described below.

Each busbar 30 is formed by punching a metal plate, and is a member having the shape of a substantially rectangular plate in plan view, as shown in FIG. 4. Examples of the material of the busbar 30 include copper, a copper alloy, aluminum, an aluminum alloy, and stainless steel (SUS). The busbar 30 is held by the insulating protector 20, and connects the positive electrode terminal 63A and the negative electrode terminal 63B of adjacent electricity storage elements 61 to each other. The busbar 30 includes a terminal connection surface 31 and a wire connection portion 32. The connection between the busbar 30 and each of the electrode terminals (63A, 63B) is achieved through laser welding, for example.

As shown in FIG. 4 and so forth, the wire connection portion 32 is formed as a portion of the busbar 30 at one end of the busbar 30 on the long side thereof. In the present embodiment, the wire connection portion 32 is formed by punching and bending a copper thin plate that forms the busbar 30. That is, the wire connection portion 32 stands substantially upright from the terminal connection surface 31 of the busbar 30.

An end portion of the detection wire 50 is connected to the wire connection portion 32. More specifically, as shown in FIG. 5, the wire connection portion 32 includes a core wire connection portion 33 to which the core wire 51 of the detection wire 50 is connected, for example, through ultrasonic welding. The wire connection portion 32 also includes a crimped portion 34 that is crimped to the core wire 51 of the detection wire 50.

Note that busbars (30A, 30B) having a width (a length in the arrow Y direction) different from that of the busbars 30 are disposed at the positions corresponding to the external connection electrodes. Also, the busbar 30A is provided with the wire connection portion 32, whereas the busbar 30B is not provided with the wire connection portion 32.

2. Outline of Assembly of Electricity Storage Module

To assemble the electricity storage module 100 of the present embodiment described above, first, an insulating protector 20 as shown in FIG. 3 is provided, and busbars (30, 30A, 30B) to which detection wires 50 are connected are also provided. The busbars (30, 30A, 30B) are accommodated in and held by the respective busbar holding portions (21, 21A, 21B) of the insulating protector 20. At that time, a bundle of the detection wires 50 is routed in the main line path 29, and each detection wire 50 is routed in the corresponding branch line path 40. When routing each detection wire 50 in the corresponding branch line path 40, the detection wire 50 is routed in the branch line path 40 by deforming the elastic retaining piece 42 so as to widen the gap K1 since the gap K1 between the elastic retaining piece 42 and the second path wall 41B opposed thereto is smaller than the diameter K2 of the detection wire 50. This completes assembly of the connection module 10. The connection module 10 assembled in this manner is attached to the electrode placement surface 62 of the electricity storage element group 60, thus completing an electricity storage module 100.

3. Effects of the Present Embodiment

In the present embodiment, the elastic retaining piece 42 that elastically deforms in the width direction of the branch line path 40 is formed at the top portion 41p of the first path wall 41A (at least one of the pair of path walls) of the branch line path 40. In addition, the elastic retaining piece 42 has a shape in which the gap K1 between the elastic retaining piece 42 and the second path wall 41B opposed thereto is smaller than the diameter K2 of the detection wire 50. Accordingly, even when the branch line path 40 has a small width, and the gap K1 between the elastic retaining piece 42 and the second path wall 41B opposed thereto is smaller than the diameter K2 of the detection wire 50, the detection wire 50 can be routed in the branch line path by elastically deforming the elastic retaining piece 42 in the width direction of the branch line path when routing the detection wire 50 in the branch line path.

After the detection wire 50 has been routed, the elastic retaining piece 42 returns to its original position, and the gap between the elastic retaining piece 42 and the second path wall 41B opposed thereto becomes smaller than the diameter K2 of the detection wire. Accordingly, it is possible to prevent the detection wire 50 from coming away from the branch line path 40. That is, according to the present embodiment, even when the branch line path 40 is formed as a narrow path, it is possible to prevent the detection wire 50 from coming away from the branch line path 40 with a simple configuration.

Other Embodiments

The technique described herein is not limited to the embodiments described and illustrated above. For example, the following embodiments are also included in the technical scope thereof.

(1) In the above embodiment, an example is shown in which the elastic retaining piece 42 is formed at the top portion 41p of the first path wall 41A; however, the present disclosure is not limited thereto. For example, the elastic retaining piece 42 may be provided at an intermediate portion of the first path wall 41A. Alternatively, the elastic retaining piece 42 may be formed on the second path wall 41B, or may be provided on both of the first path wall 41A and the second path wall 41B. In short, the elastic retaining piece 42 may be formed on at least one of the pair of path walls.

(2) in the above embodiment, an example is shown in which the slits 43 are provided adjacent to the elastic retaining piece 42 on opposite sides thereof, however, the present disclosure is not limited thereto. For example, the slits 43 may be provided adjacent to the elastic retaining piece 42 on one side thereof, or need not be provided adjacent to the elastic retaining piece 42.

(3) In the above embodiment, an example is shown in which the elastic retaining piece 42 and the slits 43 are formed on/in the first path wall 41A located at the branch portion 40A; however, the present disclosure is not limited thereto. For example, the elastic retaining piece 42 and the slits 43 may be provided at/in the link portion 40B.

(4) In the above embodiment, an example is shown in which the branch portion bottom surface 44 is located at a position higher than the bottom surface 45 of the busbar connection portion 40C and the bottom surface 29B of the main line path 29; however, the present disclosure is not limited thereto. For example, the positions of the branch portion bottom surface 44 and the bottom surface 45 of the busbar connection portion 40C in the height direction (the arrow Z direction in FIG. 7) may be the same. Alternatively, the positions of the branch portion bottom surface 44 and the bottom surface 29B of the main line path 29 in the height direction (the arrow Z direction in FIG. 7) may be the same. Alternatively, there may be no step between the bottom surface 29B of the main line path 23, the branch portion bottom surface 44, and the bottom surface 45 of the busbar connection portion 40C, and the three bottom surfaces (29B, 44, 45) may be flush with each other.

(5) In the above embodiment, an example is shown in which the branch line path 40 includes, between the busbar connection portion 40C and the branch portion 40A, the link portion 40B having the tapered bottom surface 49 that is inclined toward the branch portion bottom surface 44 from the bottom surface 45 of the busbar connection portion 40C; however, the present disclosure is not limited thereto, and the link portion 40B may be omitted, in that case, there may or may not be a step between the busbar connection portion 40C and the branch portion 40A, specifically, between the bottom surface 45 of the busbar connection portion 40C and the branch portion bottom surface 44.

LIST OF REFERENCE NUMERALS

10: Wiring module
20: Insulating protector
21: Busbar holding portion
22. Insulating wall (first path wall)
29: Main line path
29B: Bottom surface of main line path
30 Busbar
40: Branch line path
40A: Branch portion
40B: Link portion
40C: Busbar connection portion
41A: First path wall (one of the pair of path walls)
41B: Second path wall (the other of the pair of path walls)
41p: Top portion of path wall
42: Elastic retaining piece
43: Slit
44: Branch portion bottom surface
45: Bottom surface of busbar connection portion
49: Tapered bottom surface
50: Detection wire
51: Core wire
52: Insulating covering

What is claimed is:

1. A connection module configured to be attached to an electricity storage element group in which a plurality of electricity storage elements including positive and negative electrode terminals are arranged, the connection module comprising:
a busbar configured to connect the electrode terminals of adjacent electricity storage elements to each other;
an insulating protector configured to hold the busbar in an insulated manner; and
a detection wire configured to be connected to the busbar, and to detect a state of the electricity storage elements,
wherein the insulating protector includes:
a main line path in which the detection wire is routed in a bundled form; and
a branch line path that branches from the main line path, has a width narrower than a width of the main line path, and in which the detection wire is routed,
the branch line path includes:
a pair of opposing path walls; and
an elastic retaining piece that is formed on at least one of the pair of path walls, and that elastically deforms in a width direction of the branch line path, and
the elastic retaining piece is shaped so that a gap between the elastic retaining piece and one of the pair of path walls opposed thereto is smaller than a diameter of the detection wire.

2. A connection module configured to be attached to an electricity storage element group in which a plurality of electricity storage elements including positive and negative electrode terminals are arranged, the connection module comprising:
a busbar configured to connect the electrode terminals of adjacent electricity storage elements to each other;
an insulating protector configured to hold the busbar in an insulated manner; and
a detection wire configured to be connected to the busbar, and to detect a state of the electricity storage elements,
wherein the insulating protector includes:
a main line path in which the detection wire is routed in a bundled form; and
a branch line path that branches from the main line path, has a width narrower than a width of the main line path, and in which the detection wire is routed,
the branch line path includes:
a pair of opposing path walls; and
an elastic retaining piece that is formed on at least one of the pair of path walls, and that elastically deforms in a width direction of the branch line path,
the elastic retaining piece is shaped so that a gap between the elastic retaining piece and one of the pair of path walls opposed thereto is smaller than a diameter of the detection wire,
wherein the branch line path includes a busbar connection portion at which the detection wire is connected to the busbar, and
the path wall on which the elastic retaining piece is formed has a slit that is provided adjacent to the elastic retaining piece, and that extends downward from a top portion of the path wall, a distal end portion of the slit being located at a predetermined distance from a bottom surface of the busbar connection portion.

3. The connection module according to claim 2, wherein the elastic retaining piece is formed on a top portion of at least one of the pair of path walls.

4. The connection module according to claim 2, wherein the branch line path includes a branch portion extending in connection with the main line path, and
the branch portion has a branch portion bottom surface that is located at a position higher than the bottom surface of the busbar connection portion and a bottom surface of the main line path.

5. The connection module according to claim 4, wherein the elastic retaining piece and the slit are formed on/in the path wall that is located at the branch portion.

6. The connection module according to claim 4, wherein the branch line path includes
a link portion that is located between the busbar connection portion and the branch portion, and configured to link the busbar connection portion and the branch portion with each other, the link portion including a tapered bottom surface that is inclined toward the branch portion bottom surface from the bottom surface of the busbar connection portion.

* * * * *